(12) United States Patent
Shiraishi et al.

(10) Patent No.: US 10,129,443 B2
(45) Date of Patent: Nov. 13, 2018

(54) IMAGING DEVICE

(71) Applicant: J.S.T. MFG. CO., LTD., Osaka-shi (JP)

(72) Inventors: Makoto Shiraishi, Miyoshi (JP); Hiroshi Yamada, Miyoshi (JP)

(73) Assignee: J.S.T. MFG. CO., LTD., Osaka-shi (JP)

( * ) Notice: Subject to any disclaimer, the term of this patent is extended or adjusted under 35 U.S.C. 154(b) by 0 days.

(21) Appl. No.: 15/668,005

(22) Filed: Aug. 3, 2017

(65) Prior Publication Data

US 2018/0048792 A1 Feb. 15, 2018

(30) Foreign Application Priority Data

Aug. 9, 2016 (JP) .................................. 2016-156148

(51) Int. Cl.
*H04N 5/225* (2006.01)
*G03B 17/02* (2006.01)
(Continued)

(52) U.S. Cl.
CPC ........... *H04N 5/2252* (2013.01); *G03B 17/02* (2013.01); *H01R 13/112* (2013.01); *H01R 13/26* (2013.01); *H01R 13/64* (2013.01); *H04N 5/2257* (2013.01)

(58) Field of Classification Search
CPC .. H04N 5/2252; H04N 5/2257; H01R 13/112; H01R 13/26; H01R 13/64; G03B 17/02
See application file for complete search history.

(56) References Cited

U.S. PATENT DOCUMENTS 8,482,665 B2 * 7/2013 Jeon ..................... H04N 5/2257
                                                        348/149
9,160,908 B2 * 10/2015 Mori ..................... H04N 5/2252
(Continued)

FOREIGN PATENT DOCUMENTS

JP          2013-210480 A1    10/2013

OTHER PUBLICATIONS

U.S. Office Action for counterpart U.S. Appl. No. 15/286,899 dated Sep. 5, 2017 (8 Sheets).

*Primary Examiner* — Lin Ye
*Assistant Examiner* — John H Morehead, III
(74) *Attorney, Agent, or Firm* — Kratz, Quintos & Hanson, LLP

(57) ABSTRACT

An imaging device of the present invention includes: a first case having an opening; a substrate on which a first terminal electrically connected to an imaging element is mounted, the substrate being provided in the first case; a second case covering the opening of the first case; and a connector. A first terminal accommodation portion accommodating the first terminal is fixed to the substrate. The connector includes a second terminal accommodation portion accommodating a second terminal electrically connected to the first terminal. The second case has a through hole. The first and second terminals are configured so that, in a process in which the first terminal accommodation portion and the second terminal accommodation portion are inserted to be accommodated in the through hole, the first and second terminals come into contact with each other while sliding on each other and the first and second terminals are elastically deformable upon contact with each other.

7 Claims, 9 Drawing Sheets

(51) Int. Cl.
  *H01R 13/11*   (2006.01)
  *H01R 13/26*   (2006.01)
  *H01R 13/64*   (2006.01)

(56) References Cited

U.S. PATENT DOCUMENTS

| | | | |
|---|---|---|---|
| 9,554,022 B2 * | 1/2017 | Yang | H04N 5/2252 |
| 9,967,443 B2 * | 5/2018 | Shiraishi | H04N 5/2257 |
| 2010/0097519 A1 * | 4/2010 | Byrne | B60R 1/00 |
| | | | 348/373 |
| 2013/0242099 A1 * | 9/2013 | Sauer | H04N 5/2257 |
| | | | 348/148 |
| 2013/0293771 A1 | 11/2013 | Mori | |
| 2015/0280373 A1 * | 10/2015 | Furukawa | H01R 13/46 |
| | | | 439/578 |
| 2015/0325964 A1 * | 11/2015 | Kunieda | H01R 24/38 |
| | | | 439/578 |
| 2017/0126945 A1 | 5/2017 | Shiraishi | |

* cited by examiner

FRONT ←——→ REAR

IMAGING DEVICE

CROSS REFERENCE TO RELATED APPLICATION

The present application claims priority from Japanese Patent Application No. 2016-156148, which was filed on Aug. 9, 2016, the disclosure of which is herein incorporated by reference in its entirety.

BACKGROUND OF THE INVENTION

Technical Field

The present invention relates to an imaging device configured to be mounted on a vehicle or the like.

Background Art

Japanese Unexamined Patent Publication No. 2013-210480 discloses an imaging device configured to be mounted on a vehicle or the like. The imaging device includes a camera case, and a substrate accommodated in the camera case. The camera case includes: a front case to which a protector protecting a lens is attached; and a rear case designed to be mated with an external connector. The external connector includes: terminals provided at ends of cables; and a connector housing accommodating these terminals. Female terminals electrically connected to an imaging element are mounted on the substrate accommodated in the camera case. The female terminals are accommodated in an accommodation housing fixed to the substrate. The rear case includes male terminals, each having a first end portion electrically connected to the corresponding one of the terminals of the external connector and a second end portion designed to be electrically connected to the corresponding one of the female terminals mounted on the substrate. The rear case further includes a mating housing capable of being mated with the accommodation housing and configured so that the second end portions of the male terminals protrude from a bottom portion of the mating housing.

Mating of the accommodation housing with the mating housing causes the female terminals and the male terminals to be brought into contact with each other and electrically connected to each other, respectively. As a result, the external connector and the imaging element are electrically connected to each other.

SUMMARY OF INVENTION

In the imaging device described in the above publication, the female terminals mounted on the substrate are configured to be elastically deformable, upon contact with the respective male terminals, in an orthogonal direction orthogonal to a mating direction in which the accommodation housing and the mating housing are mated with each other. However, the male terminals are not elastically deformable in the orthogonal direction. If the imaging device is subjected to vibration and/or shock, there is a possibility that the vibration and/or shock cannot be sufficiently absorbed by the elastic deformation of the female terminals only, causing a contact failure due to separation of the female and male terminals from each other in the orthogonal direction. Such a possible contact failure reduces the reliability in the electrical connection between the terminals.

In view of the above, an object of the present invention is to provide an imaging device capable of improving the reliability in the electrical connection between terminals.

According to an embodiment of the present invention, an imaging device includes: a first case having an opening; a substrate on which a first terminal electrically connected to an imaging element is mounted, the substrate being provided in the first case; a lens member attached to the first case or to the substrate; a second case covering the opening of the first case; and a connector. A first terminal accommodation portion accommodating the first terminal is fixed to the substrate. The connector includes a second terminal accommodation portion accommodating a second terminal designed to be electrically connected to the first terminal. The second case has a through hole extending in an opposed direction in which the first case and the second case are opposed to each other, the through hole being capable of accommodating the first terminal accommodation portion and the second terminal accommodation portion. The second terminal is connected with a cable. The connector is attachable to the second case so that the second terminal accommodation portion is accommodated in the through hole while the connector is attached to the second case. The first and second terminals extend along the opposed direction. The first and second terminals are configured so that, in a process in which the first terminal accommodation portion and the second terminal accommodation portion are inserted to be accommodated in the through hole, the first and second terminals come into contact with each other while sliding on each other in the through hole and the first and second terminals are elastically deformable in a first direction orthogonal to the opposed direction upon contact with each other.

In the above arrangement, both the first and second terminals are elastically deformable in the first direction. Therefore, if the imaging device is subjected to vibration and/or shock, it is possible to absorb the vibration and/or shock between the terminals, as compared with cases where either one of the terminals is elastically deformable in the first direction. This improves the reliability in the electrical connection between the first terminal and the second terminal.

Furthermore, in the above arrangement, the connector and the imaging element are electrically connected to each other by bringing the first and second terminals into contact with each other in the through hole of the second case. Conventionally, a third terminal is attached to the second case, and the electrical connection between the connector and the imaging element is achieved by bringing each of the first and second terminals into contact with the third terminal to establish electrical connection between the first and second terminals via the third terminal. In the above-described arrangement, however, the first and second terminals are directly in contact with each other. This makes it possible to reduce the number of connections between terminals, to improve the reliability in the electrical connection between the first and second terminals.

Furthermore, because the cable is connected to the second terminal accommodated in the second terminal accommodation portion of the connector attachable to the second case, interference by the cable with a tool for attaching the second case to the first case is avoidable by detaching the connector from the second case when attaching the second case to the first case. This improves the operability in the process of assembling the imaging device.

Furthermore, in the above arrangement, it is preferable that: the second case includes a surrounding wall surrounding the through hole; the connector includes an elastic member made of elastic material; and the elastic member pushes the surrounding wall from its inside throughout its entire circumference when the connector is attached to the second case with the second terminal accommodation portion accommodated in the through hole.

In the above arrangement, the elastic member is in close contact with the second case to eliminate a gap between them, and this prevents liquid or the like from entering inside from between the connector and the second case.

Furthermore, in the above arrangement, it is preferable that: the connector includes a cover member opposed to the elastic member; the second terminal accommodation portion, the elastic member, and the cover member are aligned in the opposed direction in the connector; and the cable is supported by the elastic member and by the cover member.

In the above arrangement, when the second terminal accommodation portion is inserted to be accommodated in the through hole of the second case, pushing the cover member of the connector toward the through hole allows the whole connector including the elastic member and the second terminal accommodation portion to be displaced forward, so that the second terminal accommodation portion can be accommodated in the through hole. This enables configuration in which the first terminal and the second terminal slide on each other in the through hole while being in contact with each other.

Furthermore, in the above arrangement, it is preferable that: at least one of the second terminal accommodation portion and the cover member is provided with one or more boss portions each protruding toward the elastic member; and the elastic member is provided with one or more recesses positioned so as to be respectively opposed to the one or more boss portions, each of the recesses being recessed in the opposed direction.

When the cover member is displaced forward, the displacement of the cover member is absorbed by the elastic deformation of the elastic member. In this regard, the distance between the second terminal accommodation portion and the cover member is shorter at a position in which the boss portion is provided, and a part of the elastic member, which is opposed to the boss portion of the second terminal accommodation portion and/or opposed to the boss portion of the cover member, has a smaller thickness. Due to this, at the part of the elastic member, which is opposed to the boss portion(s), the amount of deformation of the elastic member at the time when the cover member is displaced forward is smaller, and it is easier to transmit the force from the cover member to the second terminal accommodation portion. For this reason, when the cover member is displaced, the second terminal accommodation portion is displaced forward by a distance substantially equal to the displacement of the cover member. This enables the second terminal accommodation portion to be completely accommodated in the through hole. Accordingly, it is possible to prevent a contact failure between the first terminal and the second terminal.

Furthermore, in the above arrangement, it is preferable that: at least one of the second terminal accommodation portion and the cover member is provided with two or more boss portions; and the two or more boss portions are positioned symmetrical with respect to a center of the connector or with respect to a line passing through the center of the connector, when the connector is viewed in the opposed direction.

In the above arrangement, the two or more boss portions are positioned symmetrical with respect to the center of the connector or with respect to a line passing through the center, and therefore it is more likely that the force from the cover member is uniformly exerted onto the second terminal accommodation portion. This makes it easier for the second terminal accommodation portion is entirely displaced forward, with the result that the whole connector is accommodated in the through hole.

Furthermore, in the above arrangement, it is preferable that: the connector includes a first engaging portion designed to be engaged with the second case; and the second case includes a second engaging portion designed to be engaged with the first engaging portion after completion of sliding of the first and second terminals on each other.

In the above arrangement, the state in which the sliding of the first terminal and the second terminal on each other is completed, i.e., the state in which the first and second terminals are in contact with each other continues. This reduces the possibility that poor connection occurs between the first and second terminals.

Furthermore, in the above arrangement, it is preferable that the connector is detachable from the second case after attached to the second case. The first case and the second case are easily replaceable by detaching the connector from the second case.

DESCRIPTION OF EMBODIMENTS

Figure 1:
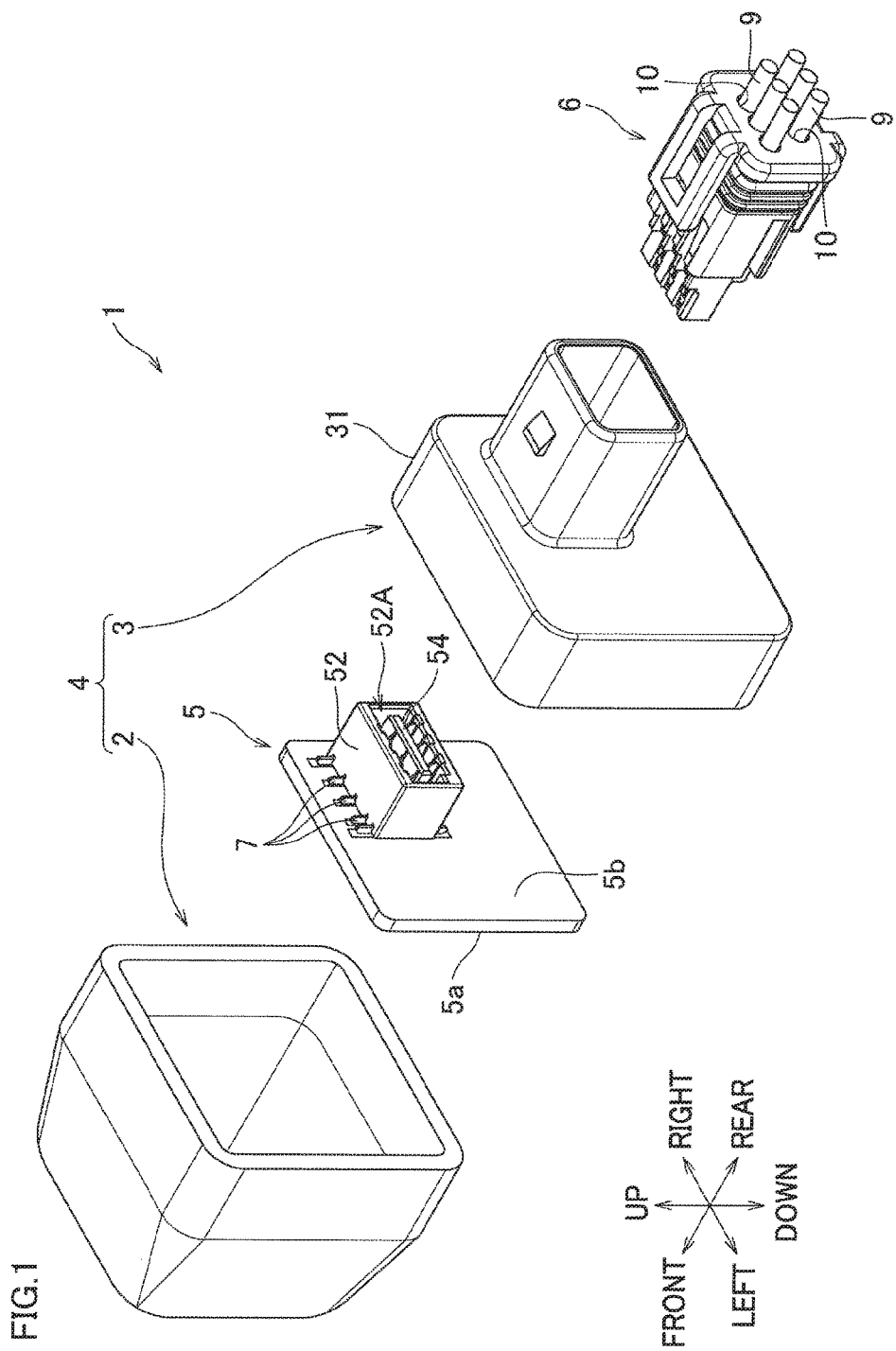
FIG. 1 is an exploded perspective view of an imaging device of an embodiment of the present invention, and shows the imaging device viewed from the rear.
Figure 2:
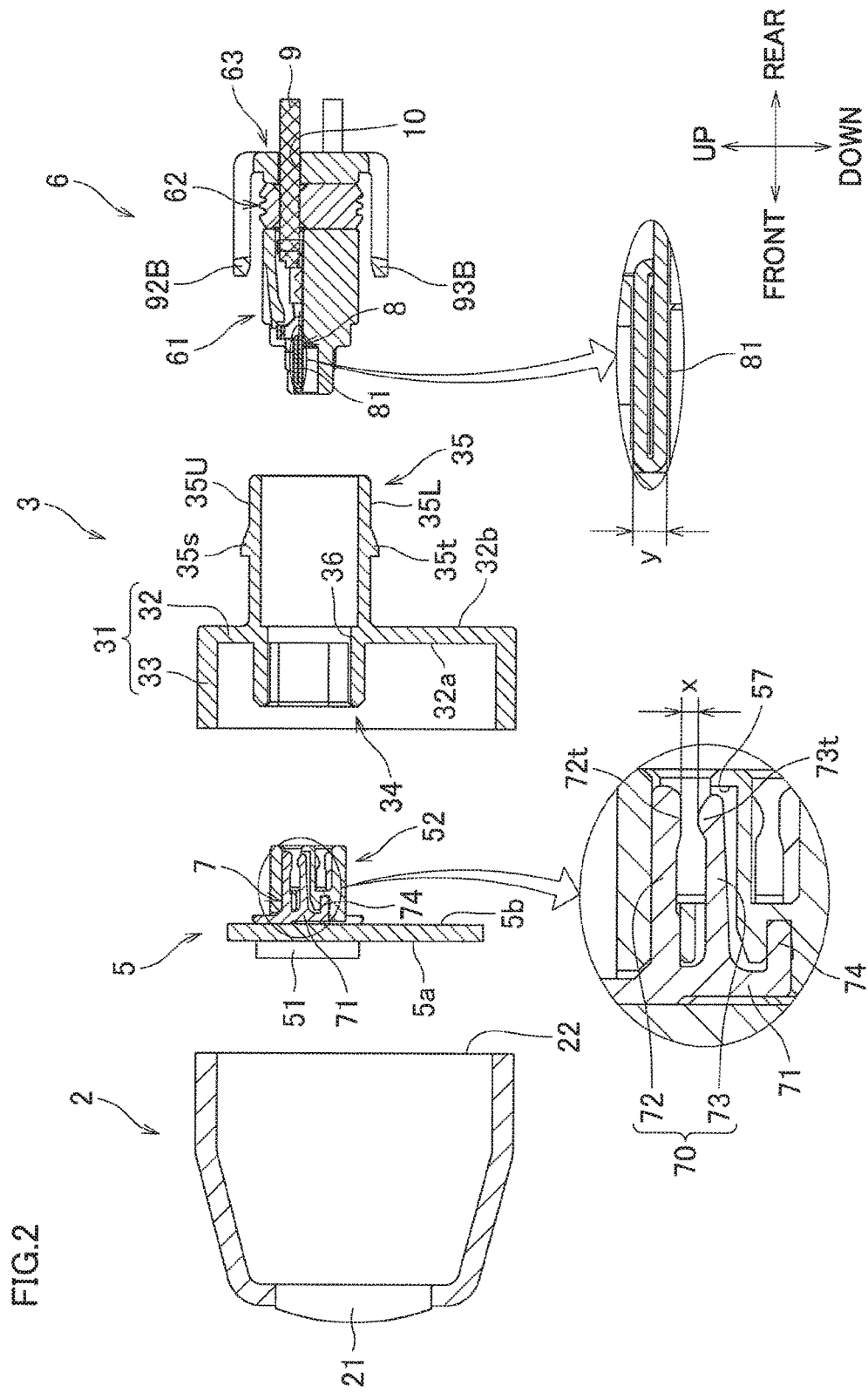
FIG. 2 is an exploded cross sectional view of the imaging device shown in FIG. 1.

As shown in FIG. 1 and FIG. 2, an imaging device 1 according to an embodiment of the present invention includes: a camera case 4 having a front case 2 functioning as a first case and a rear case 3 functioning as a second case; a substrate 5 accommodated in the camera case 4; and a connector 6 designed to be mated with a rear portion of the camera case 4. The front case 2 and the rear case 3 are opposed to each other in a front-rear direction in the figures. Hereinafter, the front-rear direction in which the front case 2 and the rear case 3 are opposed to each other may be referred to as an "opposed direction". The imaging device 1 is configured to be mounted on a vehicle or the like to capture an image of the scenery outside the vehicle.

Figure 9:
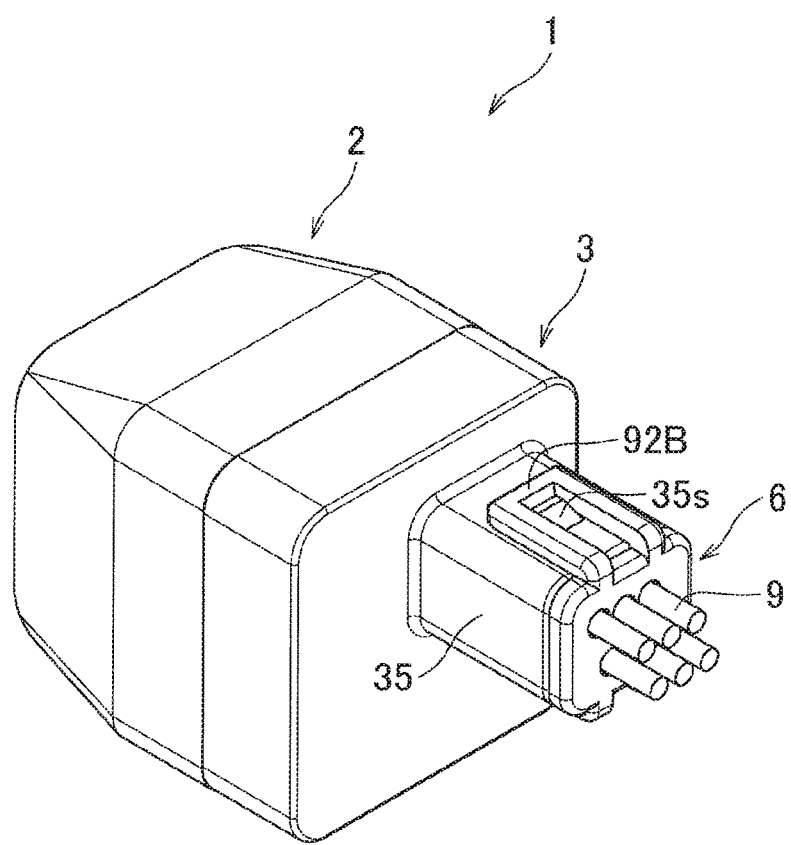
FIG. 9 is a rear perspective view of the imaging device.

In the assembled imaging device 1, the front case 2 and the rear case 3 are in contact with each other via a sealing member or the like, and fixed together by welding, by an adhesive, by screws, or the like. This renders the imaging device 1 waterproof (see FIG. 9). The front case 2 and the rear case 3 are made of resin.

<Front Case>

The front case 2 has a box-like shape. As shown in FIG. 2, a protector 21 is unitarily attached to a front end portion of the front case 2. As the protector 21, a transparent member made of resin or a transparent film-like member may be used, for example. The front case 2 has, at its rear end portion, an opening 22 provided so as to be opposed to the protector 21. Although not illustrated, a fixing plate for fixing the substrate 5 is provided on an inner surface of the front case 2.

<Rear Case>

As shown in FIG. 1 and FIG. 2, the rear case 3 has a rear portion 31 covering the opening 22 of the front case 2. The rear portion 31 has: a flat-plate portion 32 opposed to the substrate 5; and a peripheral wall portion 33 protruding forward from a peripheral edge of the flat-plate portion 32. The peripheral wall portion 33 is in contact with the front case 2 via the sealing member or the like (see FIG. 8A).

The flat-plate portion 32 has: a front face 32a opposed to the substrate 5; and a rear face 32b which is on the opposite side of the flat-plate portion 32 from the substrate 5. A front housing 34 protrudes forward from the front face 32a. A rear housing 35 structuring a surrounding wall protrudes rearward from the rear face 32b. The front housing 34 and the rear housing 35 are positioned so as to be opposed to each other in the front-rear direction with the flat-plate portion 32 between the housings 34 and 35. A through hole 36 is provided through the front housing 34, the flat-plate portion 32, and the rear housing 35 in the front-rear direction. The through hole 36 passes through the rear case 3 in the front-rear direction.

A substrate housing 52 structuring a first terminal accommodation portion is attached to the front housing 34 (see FIG. 8A, which will be described later). The substrate housing 52 is accommodated in the through hole 36.

The connector 6 is attachable to/detachable from the rear housing 35 (see FIG. 8C, which will be described later). A connector housing 61 of the connector 6 is accommodated in the through hole 36 when the connector 6 is attached to the rear housing 35. The connector housing 61 will be described later.

An upper engaging portion 35s functioning as a second engaging portion protrudes upward from an upper wall 35U of the rear housing 35. Meanwhile, a lower engaging portion 35t functioning as another second engaging portion protrudes downward from a lower wall 35L of the rear housing 35. When the connector 6 is attached to the rear housing 35, the upper engaging portion 35s and the lower engaging portion 35t are respectively engaged with an upper extension portion 92 and a lower extension portion 93 (see FIG. 8C) of the connector 6. The upper and lower extension portions 92 and 93 function as first engaging portions.

<Substrate>

As shown in FIG. 2, the substrate 5 has a front face 5a opposed to the protector 21, and a rear face 5b opposed to the rear portion 31. A lens member 51 including at least one lens is attached to the front face 5a of the substrate 5. Further, an unillustrated imaging element such as a charge-coupled device (CCD) and a complementary metal oxide semiconductor (CMOS) is mounted on the front face 5a. As shown in FIG. 1, the substrate housing 52 protruding toward the rear portion 31 is fixed to the rear face 5b of the substrate 5. The substrate housing 52 accommodates therein six female terminals 7 functioning as first terminals. The six female terminals 7 are mounted on the rear face 5b of the substrate 5.

As shown in FIG. 2, each of the female terminals 7 is a fork type terminal with a uniform thickness formed by stamping a metal plate. Each female terminal 7 has: a pair of contact pieces 70 opposed to each other in an up-down direction; and a connecting piece 71 holding front ends of the pair of contact pieces 70.

The pair of contact pieces 70 is constituted by: an upper contact piece 72 and a lower contact piece 73, each of which extends in the front-rear direction. The upper and lower contact pieces 72 and 73 are separate from each other in the up-down direction. The front end of the upper contact piece 72 and the front end of the lower contact piece 73 are connected to the connecting piece 71 extending in the up-down direction. Due to this, the pair of contact pieces 70 is configured so that its rear end portions are displaceable in the up-down direction, that is, configured to be elastically deformable. In the present embodiment, the upper contact piece 72 is somewhat longer than the lower contact piece 73.

The upper contact piece 72 has, at its rear end portion, an upper protrusion 72t protruding toward the lower contact piece 73 (downward in an enlarged view in FIG. 2). The lower contact piece 73 has, at its rear end portion, a lower protrusion 73t protruding toward the rear end portion of the upper contact piece 72 (upward in the enlarged view in FIG. 2). A distance x between a leading end (lower end in the enlarged view in FIG. 2) of the upper protrusion 72t and a leading end (upper end in the enlarged view in FIG. 2) of the lower protrusion 73t is slightly shorter than a thickness y in the up-down direction of a contact portion 81 of each male terminal 8, which will be described later.

The connecting piece 71 is mounted on the rear face 5b of the substrate 5. The connecting piece 71 is electrically connected to the imaging element mounted on the substrate 5, via unillustrated wiring on the substrate 5.

A fixing piece 74 extends rearward from a lower end of the connecting piece 71. The fixing piece 74 is provided to fix the female terminal 7 to the substrate housing 52.

Figure 3A:
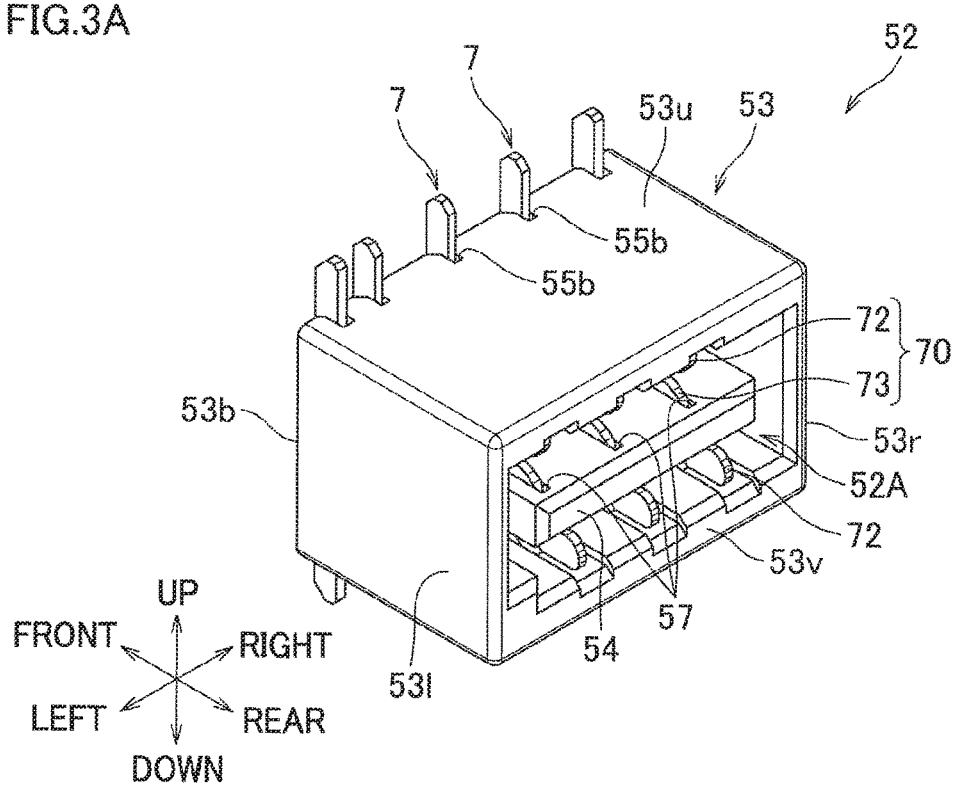
FIG. 3A is a perspective view of a substrate housing fixed to a substrate shown in FIG. 1, and shows the substrate housing viewed from the rear.

The female terminals 7 are respectively inserted into holes 55b provided in a bottom wall 53b of the substrate housing 52 (see FIG. 3A). As described above, the substrate housing 52 accommodates therein the six female terminals 7. Each of three of the six female terminals 7 is oriented so that the upper contact piece 72, the lower contact piece 73, and the fixing piece 74 are arranged in this order from top to bottom, as shown in the enlarged view in FIG. 2. The remaining three female terminals 7 are disposed upside down, i.e., in the reverse order. That is, each of the remaining female terminals 7 is oriented so that the fixing piece 74, the lower contact piece 73, and the upper contact piece 72 are arranged in this order from top to bottom (see FIG. 3B).

As shown in FIG. 3A, the substrate housing 52 has a hollow portion 52A opening rearward (toward the rear case 3 shown in FIG. 1). The hollow portion 52A is defined by a first annular wall 53. The first annular wall 53 has an upper wall 53u, a lower wall 53v, a right wall 53r, and a left wall 53l. A central wall 54 long in a left-right direction is disposed between the upper wall 53u and the lower wall 53v.

Figure 3B:
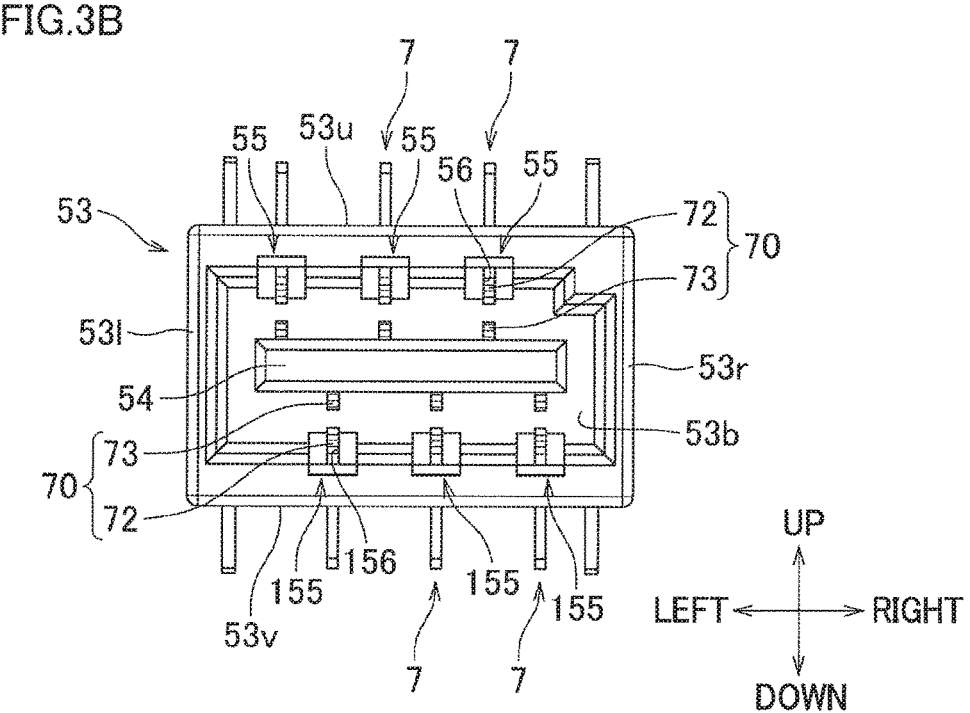
FIG. 3B is an enlarged front view of the substrate housing.

As shown in FIG. 3B, three support portions 55 spaced apart from each other in the left-right direction are provided at a corner portion connecting the bottom wall 53b with the upper wall 53u. Each support portion 55 includes a pair of support pieces with a groove 56 between them. Each support portion 55 is provided in the vicinity of the corresponding one of the holes provided in the bottom wall 53b (the holes into which the female terminals 7 are respectively inserted). The upper contact piece 72 of the female terminal 7 disposed in each groove 56 is supported by the pair of support pieces of the corresponding support portion 55 in such a manner that the upper contact piece 72 is interposed between the pair of support pieces in the left-right direction.

The central wall 54 has three grooves 57 positioned so as to be opposed to the three grooves 56. In each groove 57, the lower contact piece 73 is disposed, which is paired with the upper contact piece 72 disposed in the groove 56 opposed to the groove 57. Each groove 57 is shaped and sized so as to allow the lower contact piece 73 to be elastically deformed, thereby to be displaceable in the up-down direction (i.e., so that the lower contact piece 73 is separate from a bottom surface of the groove 57 in the up-down direction before mating) (see the enlarged view in FIG. 2).

While the structure above the central wall 54 has been described, there are support portions 155 also below the central wall 54. The support portions 155 respectively support the remaining three female terminals 7.

As shown in FIG. 3B, three support portions 155 spaced apart from each other in the left-right direction are provided at a corner portion connecting the bottom wall 53b with the lower wall 53v. Each support portion 155 includes a pair of support pieces with a groove 156 between them. The upper contact piece 72 of the female terminal 7 disposed in each groove 156 is supported by the pair of support pieces of the corresponding support portion 155 in such a manner that the upper contact piece 72 is interposed between the pair of support pieces in the left-right direction. The central wall 54 has unillustrated grooves positioned so as to be opposed to the grooves 156, respectively. In each groove of the central wall 54, the lower contact piece 73 is disposed, which is paired with the upper contact piece 72 disposed in the groove 156 opposed to the groove of the central wall 54 (see FIG. 3B). Each groove of the central wall 54 is shaped and sized so as to allow the lower contact piece 73 to be elastically deformed, thereby to be displaceable in the up-down direction (i.e., so that the lower contact piece 73 is separate from a bottom surface of the groove in the up-down direction before mating).

The positions of the three support portions 55 provided at the corner portion connecting the upper wall 53u with the bottom wall 53b are shifted in the left-right direction relative to the positions of the three support portions 155 provided at the corner portion connecting the lower wall 53v with the bottom wall 53b, by a distance corresponding to the size of the support portion 55 or 155.

<Connector>

Figure 4:
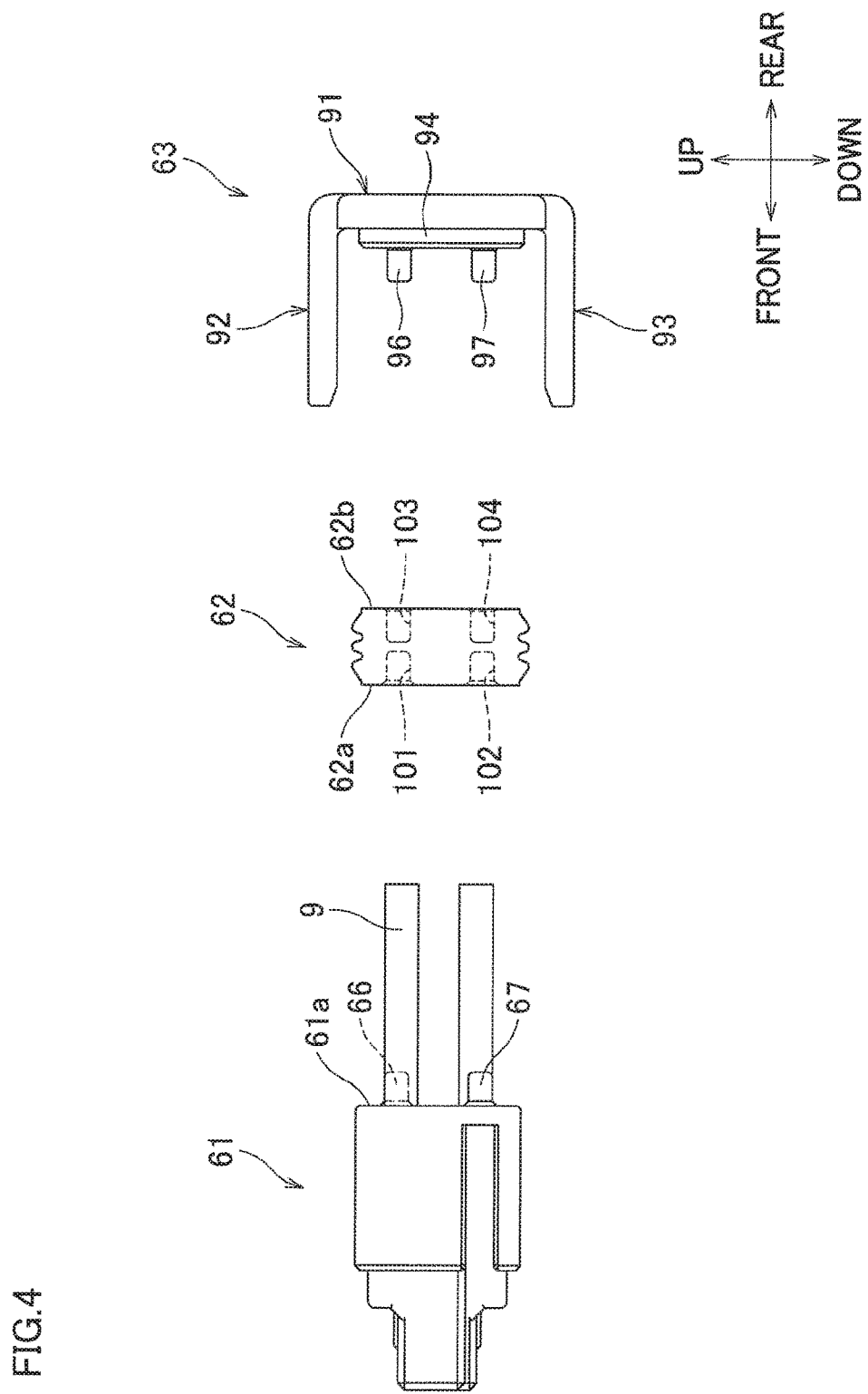
FIG. 4 is an exploded side view of a connector shown in FIG. 1.

As shown in FIG. 4, the connector 6 includes: a connector housing 61 functioning as a second terminal accommodation portion; a rubber seal 62 functioning as an elastic member; and a cover member 63. The connector housing 61, the rubber seal 62, and the cover member 63 are arranged in this order from front to rear with respect to the front-rear direction.

Figure 5A:
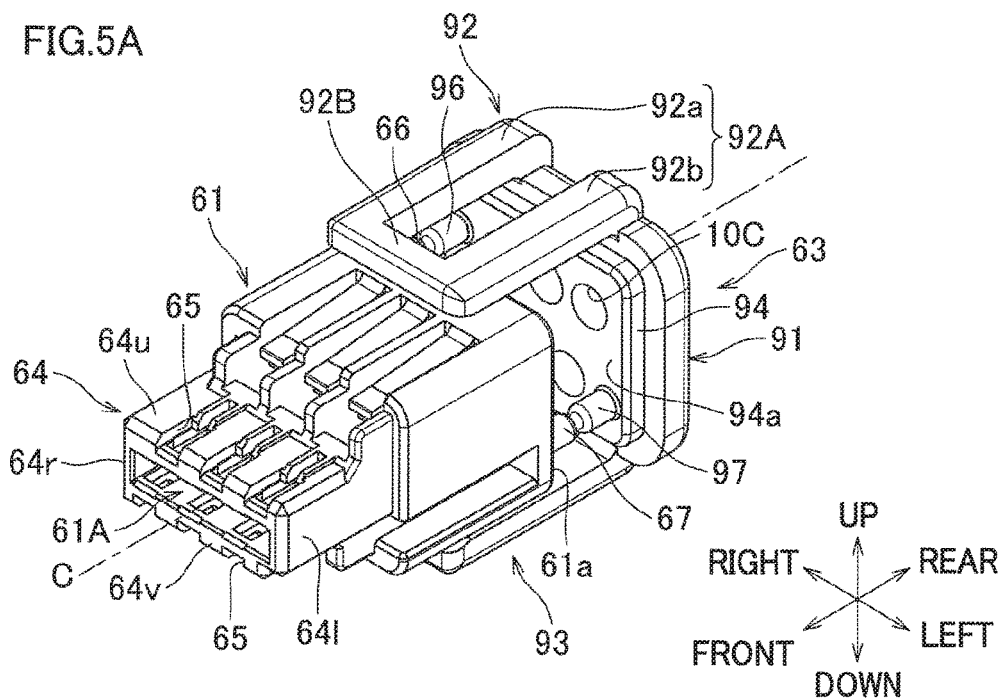
FIG. 5A is a front perspective view of the connector without a rubber seal.
Figure 5B:
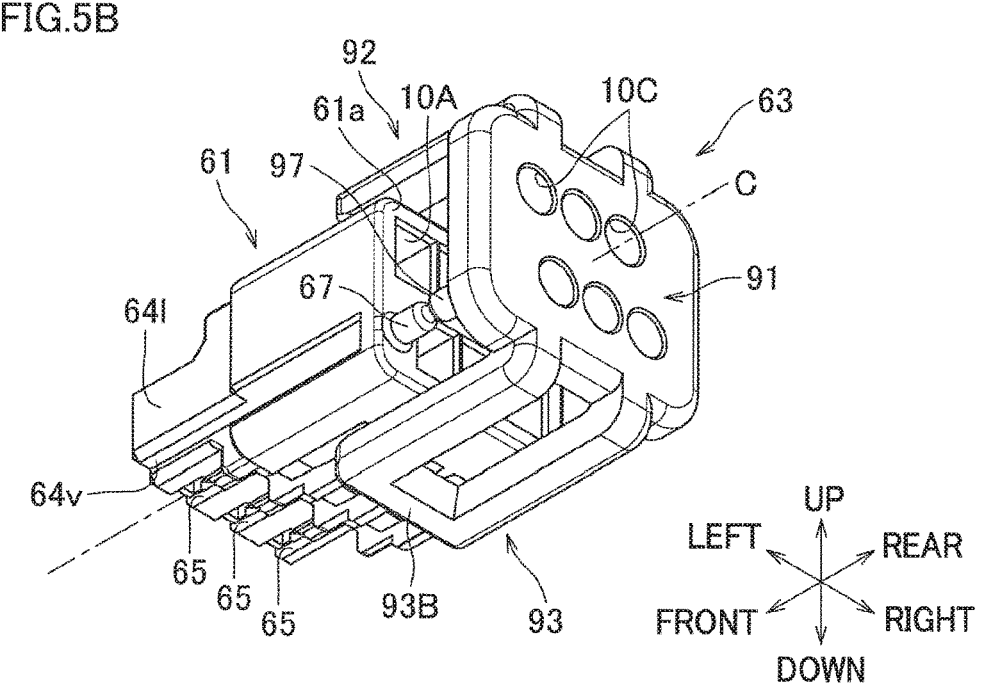
FIG. 5B is a rear perspective view of the connector without the rubber seal.

As shown in FIG. 5A, the connector housing 61 has a hollow portion 61A opening forward. When the connector housing 61 is mated with the substrate housing 52, the central wall 54 (see FIG. 1 and FIG. 3A) of the substrate housing 52 is inserted into the hollow portion 61A. In FIG. 5A and FIG. 5B, the rubber seal 62 is not illustrated.

As shown in FIG. 5A, the hollow portion 61A is defined by a second annular wall 64. The second annular wall 64 has an upper wall 64u, a lower wall 64v, a right wall 64r, and a left wall 64l. The upper wall 64u has three through holes 65. The three through holes 65 are spaced apart from each other in the left-right direction, and each through hole 65 extends in the front-rear direction. The lower wall 64v also has three through holes 65 (see FIG. 5B). The three through holes 65 of the lower wall 64v are spaced apart from each other in the left-right direction, and each through hole 65 extends in the front-rear direction. The holes 65 of the upper wall 64u and the holes 65 of the lower wall 64v respectively accommodate therein male terminals 8 functioning as second terminals (see FIG. 2). Cables 9 are connected to rear ends of the male terminals 8, respectively. In FIG. 5A and FIG. 5B, the male terminals 8 and the cables 9 are not illustrated.

As shown in FIG. 2, each male terminal 8 has a contact portion 81 designed to be in contact with the corresponding female terminal 7. As shown in the enlarged view in FIG. 2, the contact portion 81 is formed by bending a metal plate rearward 180 degrees so as to have two portions which are separate from each other in the up-down direction and are substantially parallel to each other along the front-rear direction. This structure makes the contact portion 81 elastically deformable in the up-down direction. The thickness y in the up-down direction of the contact portion 81 is slightly greater than the distance x between the upper protrusion 72t and the lower protrusion 73t of the female terminal 7 (see the enlarged view in FIG. 2). The rear ends of the male terminals 8 are connected to cores (not illustrated) of the cables 9, respectively.

The cables 9 are respectively inserted into through holes 10 of the connector 6 to pass through the through holes 10. The connector 6 has six through holes 10, through each of which, the cable 9 is provided (see FIG. 1). The six through holes 10 are arranged so that three of them are at an upper stage, and the remaining three of them are at a lower stage. When the connector 6 is viewed from the rear, the three through holes 10 at the upper stage are disposed closer to a left end of the connector than the through holes 10 at the lower stage, and the three through holes 10 at the lower stage are disposed closer to a right end of the connector than the through holes 10 at the upper stage. The positions of the three through holes 10 at the upper stage are shifted from the positions of the three through holes 10 at the lower stage, with respect to the left-right direction.

Each through hole 10 is constituted by: a through hole 10A provided through the connector housing 61; a through hole 10B provided through the rubber seal 62; and a through hole 10C provided through the cover member 63 (see FIG. 5A, FIG. 5B, FIG. 6A, and FIG. 6B).

As shown in FIG. 4, a housing upper boss portion 66 and a housing lower boss portion 67 protrude rearward from a rear face 61a of the connector housing 61. When the connector housing 61 is viewed from the rear, the housing upper boss portion 66 is provided at an upper right portion of the rear face 61b, and the housing lower boss portion 67 is provided at a lower left portion of the rear face 61b (see FIG. 5A and FIG. 5B).

When the connector 6 is viewed from the front or from the rear, the housing upper boss portion 66 and the housing lower boss portion 67 are symmetrical with respect to a center of the connector housing 61. The center of the connector housing 61 is the same as a center C of the connector 6. The center C of the connector 6 is, for example, the intersection of two diagonal lines of a quadrangle shape of the connector 6 viewed from the front or from the rear, when the connector 6 has a quadrangle shape as is in the present embodiment. When the connector 6 has a square shape (or a regular polygon) when viewed from the front or from the rear, as is in the present embodiment, the center C of the connector 6 is a point equidistant from all the vertices of the square (or the regular polygon) each having an internal angle less than 180 degrees.

As shown in FIG. 4, the cover member 63 includes: a cover portion 91 provided behind the rubber seal 62; the upper extension portion 92 extending forward from an upper portion of the cover portion 91; and the lower extension portion 93 extending forward from a lower portion of the cover portion 91.

In a plan view orthogonal to the front-rear direction, i.e., when viewed along the front-rear direction, the size of the cover portion 91 is somewhat larger than that of the rubber seal 62. The cover portion 91 is provided with a seal-facing portion 94 protruding forward. In a plan view orthogonal to the front-rear direction, i.e., when viewed along the front-rear direction, the size of the seal-facing portion 94 is substantially equal to that of the rubber seal 62. The seal-facing portion 94 is opposed to a rear-side portion 62b of the rubber seal 62 (see FIG. 7).

A cover upper boss portion 96 and a cover lower boss portion 97 protrude forward from the seal-facing portion 94 (see FIG. 5A). The cover upper boss portion 96 is provided at an upper right portion of the seal-facing portion 94 in FIG. 5A, and the cover lower boss portion 97 is provided at a lower left portion of the seal-facing portion 94 in FIG. 5A. When the cover member 63 is viewed from the front or from the rear, the cover upper boss portion 96 and the cover lower boss portion 97 are symmetrical with respect to a center of the cover member 63. The center of the cover member 63 is the same as the above-described center C of the connector 6.

In the assembled connector 6, as shown in FIG. 5A and FIG. 5B, the cover upper boss portion 96 and the housing upper boss portion 66 are opposed to each other in the front-rear direction with the unillustrated rubber seal 62 interposed between them, and the cover lower boss portion 97 and the housing lower boss portion 67 are opposed to each other in the front-rear direction with the unillustrated rubber seal 62 interposed between them.

The upper extension portion 92 of the cover member 63 has a U-shape. The upper extension portion 92 has: a pair of extension portions 92A; and a front connecting portion 92B connecting the pair of extension portions 92A and functioning as the first engaging portion. The pair of extension portions 92A is constituted by: a right extension portion 92a and a left extension portion 92b which are separate from each other in the left-right direction. The front connecting portion 92B extends in the left-right direction in FIG. 5A. When the connector 6 is attached to the rear housing 35 of the rear case 3, the front connecting portion 92B is engaged with the upper engaging portion 35s of the rear housing 35 (see FIG. 9).

As shown in FIG. 5B, the lower extension portion 93 has a structure similar to that of the upper extension portion 92. When the connector 6 is attached to the rear housing 35 of the rear case 3, a front connecting portion 93B of the lower extension portion 93 is engaged with the lower engaging portion 35t of the rear housing 35 (see FIG. 8C).

Figure 6A:
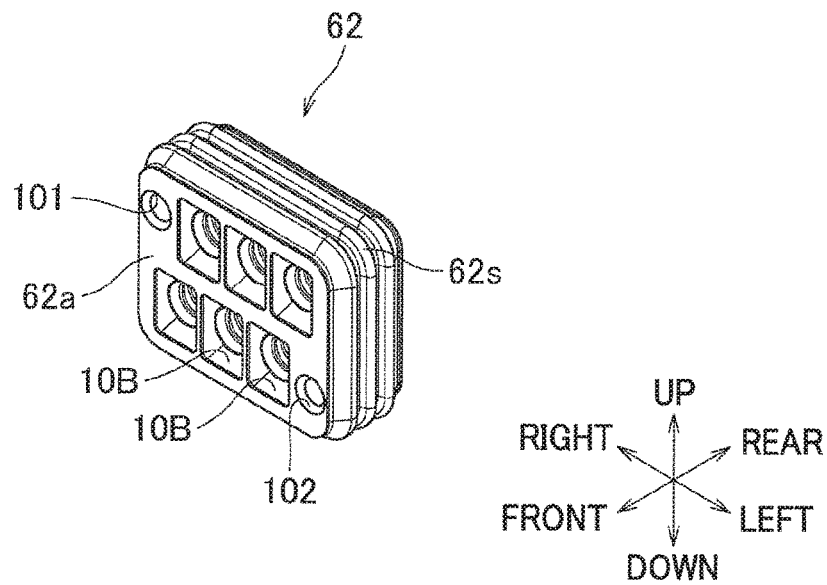
FIG. 6A is a front perspective view of the rubber seal.
Figure 6B:
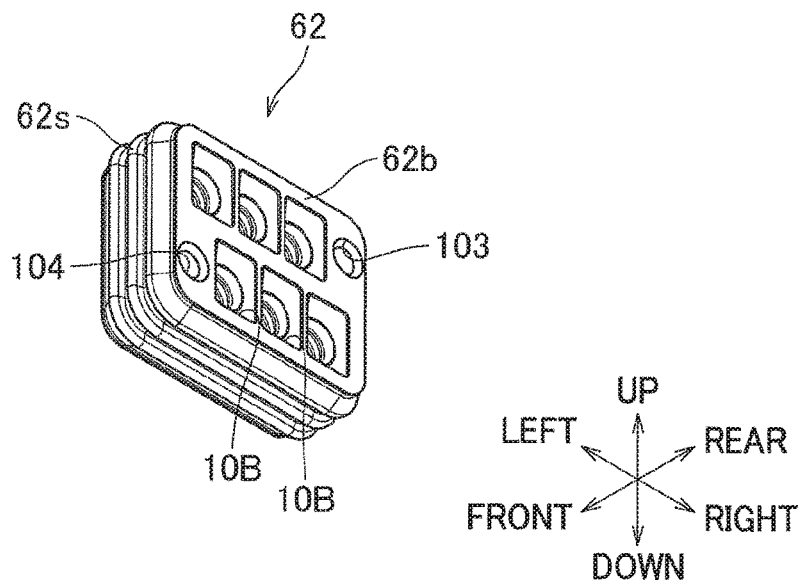
FIG. 6B is a rear perspective view of the rubber seal.

The rubber seal 62 is made of elastic material such as rubber, and is oriented so that its thickness direction is parallel to the front-rear direction, as shown in FIG. 6A. The rubber seal 62 has, throughout its entire outer circumferential surface, a number of projections and recesses alternately arranged in the thickness direction. Each projection 62s is tapered narrower, i.e., its thickness in the front-rear direction becomes smaller toward its leading end.

The rubber seal 62 has, in its front-side portion 62a, a connector-facing upper recess 101 and a connector-facing lower recess 102. The connector-facing upper recess 101 is at an upper left portion of the front-side portion 62a in FIG. 6A, while the connector-facing lower recess 102 is at a lower right portion of the front-side portion 62a in FIG. 6A. The connector-facing upper recess 101 and the connector-facing lower recess 102 open forward. The rubber seal 62 has, in its rear-side portion 62b, a cover-facing upper recess 103 and a cover-facing lower recess 104. The cover-facing upper recess 103 is at an upper right portion of the rear-side portion 62b in FIG. 6B, while the cover-facing lower recess 104 is at a lower left portion of the rear-side portion 62b in FIG. 6B. The cover-facing upper recess 103 and the cover-facing lower recess 104 open rearward. As shown in FIG. 4, the front-side portion 62a is opposed to the rear face 61a of the connector housing 61, and the rear-side portion 62b is opposed to the seal-facing portion 94 of the cover member 63.

In the front-side portion 62a, the housing upper boss portion 66 of the connector housing 61 is fitted in the connector-facing upper recess 101, and the housing lower boss portion 67 of the connector housing 61 is fitted in the connector-facing lower recess 102. In the rear-side portion 62b, the cover upper boss portion 96 of the cover portion 91 is fitted in the cover-facing upper recess 103, and the cover lower boss portion 97 is fitted in the cover-facing lower recess 104 (see FIG. 7).

With respect to the front-rear direction, a first portion of the rubber seal 62, which is between the housing upper boss portion 66 and the cover upper boss portion 96 opposed to each other, and a second portion of the rubber seal 62, which is between the housing lower boss portion 67 and the cover lower boss portion 97 opposed to each other, each has a thickness smaller than that of the remaining portion.

Now, how to assemble the connector 6 is described, with reference to FIG. 4 to FIG. 7.

First of all, the connector housing 61 accommodating therein the male terminals 8 having rear ends connected to the cables 9 is prepared. Then, the cables 9 are respectively inserted through the through holes 10B (see FIG. 6A) of the rubber seal 62, and the rubber seal 62 is brought into contact with the rear face 61a of the connector housing 61. At this time, the housing upper boss portion 66 and the housing lower boss portion 67 of the connector housing 61 are fitted in the connector-facing upper recess 101 and the connector-facing lower recess 102 of the rubber seal 62, respectively.

Subsequently, the cables 9 are respectively inserted through the through holes 10C (see FIG. 5B) of the cover member 63, and the seal-facing portion 94 is brought into contact with the rear-side portion 62b of the rubber seal 62. At this time, the cover upper boss portion 96 and the cover lower boss portion 97 of the cover member 63 are fitted in the cover-facing upper recess 103 and the cover-facing lower recess 104 of the rubber seal 62, respectively. As a result, the connector housing 61, the rubber seal 62, and the cover member 63 are united together (see FIG. 7).

In the present embodiment, the cables 9 and the rubber seal 62 are in close contact with each other, i.e., there is no gap between them. Therefore, even if liquid enters through a gap between the cover member 63 and the cables 9, the liquid is prevented from entering into the connector housing 61 from between the cables 9 and the rubber seal 62.

The upper extension portion 92 and the lower extension portion 93 of the cover member 63 are disposed with the connector housing 61 and the rubber seal 62 between the extension portions 92 and 93 in the up-down direction. The upper extension portion 92 and the lower extension portion 93 are separate from the connector housing 61 and the rubber seal 62.

Hereinafter, how to assemble the imaging device is described, with reference to FIG. 8A, FIG. 8B, and FIG. 8C.

Figure 8A:
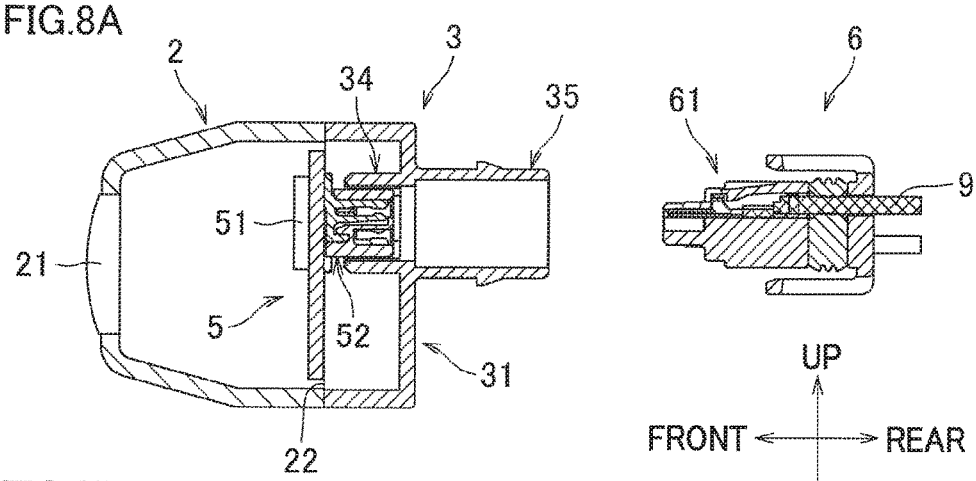
FIG. 8A, FIG. 8B, and FIG. 8C are cross sectional views showing a process of assembling the imaging device in sequence.
Figure 8B:
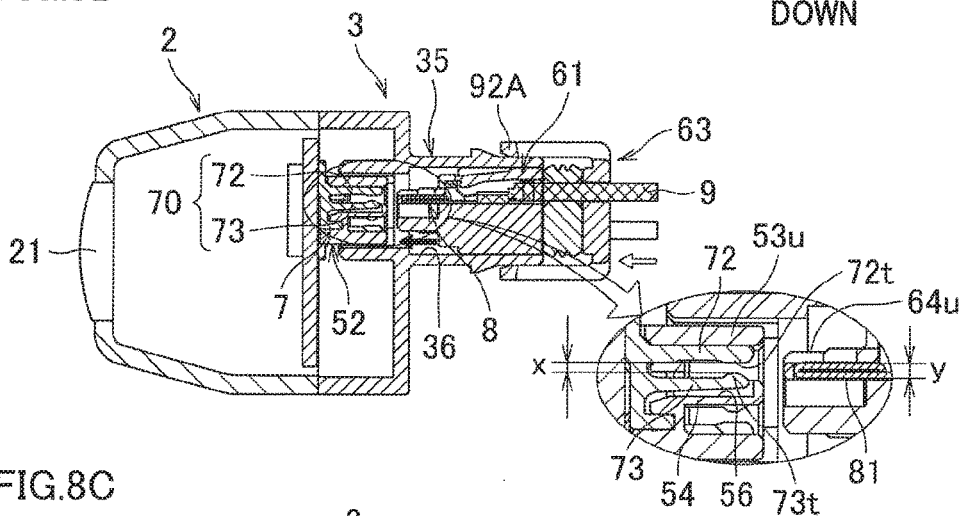

As shown in FIG. 8A, the substrate 5 is fixed to the front case 2 so that the optical axis of the imaging element mounted on the substrate 5 is coaxial with the optical axis of the protector 21. Then, while the front housing 34 of the rear case 3 is attached to the substrate housing 52, the opening 22 of the front case 2 is covered by the rear portion 31. Thereafter, the rear portion 31 is fixed to the front case 2. In this regard, the rear portion may be welded to the front case 2 by applying ultrasound or a laser beam, may be fixed to the front case 2 using an adhesive, or may be screwed to the front case 2. At this stage, the connector 6 with the cables 9 is not attached to the rear case 3, and therefore, there is no interference by the cables 9 with a tool for fixing the rear portion 31 to the front case 2.

Subsequently, while the connector 6 is attached to the rear housing 35 of the rear case 3, the connector housing 61 is mated with the substrate housing 52 in the through hole 36 of the rear case 3. In this process, as shown in an enlarged view in FIG. 8B, the upper wall 64$u$ of the connector housing 61 is disposed between the upper wall 53$u$ and the central wall 54 of the substrate housing 52. Meanwhile, the contact portion 81 of each male terminal 8 is inserted between the pair of contact pieces 70 (between the upper contact piece 72 and the lower contact piece 73) of the corresponding female terminal 7 (see FIG. 8C), and the contact portion 81 is brought into contact with the upper protrusion 72$t$ and the lower protrusion 73$t$ while sliding in the front-rear direction. Before mating, the distance x between the upper protrusion 72$t$ and the lower protrusion 73$t$ is slightly shorter than the thickness (y) in the up-down direction of the contact portion 81 (see the enlarged view in FIG. 8B). For this reason, the insertion of the contact portion 81 between the upper contact piece 72 and the lower contact piece 73 causes the lower contact piece 73 in the groove 56 of the central wall 54 to be elastically deformed, with the result that: the distance between the upper protrusion 72$t$ and the lower protrusion 73$t$ increases; and the contact portion 81 is held between the pair of contact pieces 70 in the up-down direction, as indicated with arrows in an enlarged view in FIG. 8C.

Because the metal plate forming the contact portion 81 of each male terminal 8 includes two portions which are separate from each other in the up-down direction, a force exerted by the pair of contact pieces 70 holding the contact portion 81 between them elastically deforms the contact portion 81 so that the distance between the two portions decreases.

As described above, the female terminals 7 and the male terminals 8 are configured so as to be elastically deformable in the up-down direction upon contact with each other. The male terminals 8 connected with the cables 9 are thus electrically connected to the female terminals 7, respectively, and consequently, the imaging element is electrically connected to the cables 9.

After the rubber seal 62 is disposed in the through hole 36 in the above-described process, the outer circumferential surface of the rubber seal 62 pushes an inner circumferential surface of the rear housing 35. This makes it difficult for the connector 6 to move forward even when the cover member 63 is pushed forward. Meanwhile, there is a concern about the possibility that, when the cover member 63 is displaced forward, the elastic deformability of the rubber seal 62 can absorb the displacement of the cover member 63, which makes it difficult for the connector housing 61 to be displaced forward.

Figure 7:
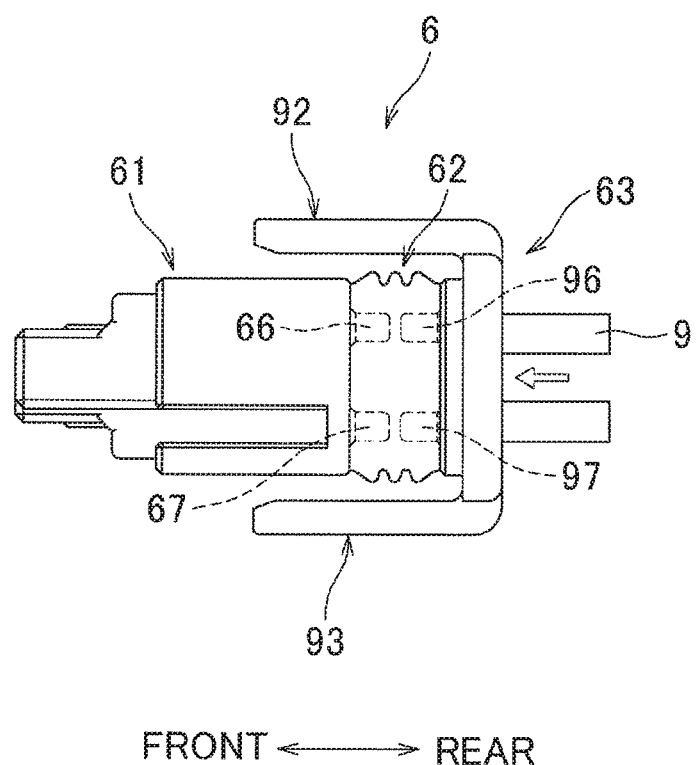
FIG. 7 is a side view of the connector.

In the present embodiment, however, as shown in FIG. 7, the portion of the rubber seal 62, which is between the housing upper boss portion 66 and the cover upper boss portion 96 opposed to each other, and the portion of the rubber seal 62, which is between the housing lower boss portion 67 and the cover lower boss portion 97 opposed to each other, each has the thickness smaller than that of the remaining portion. Accordingly, at the portions of the rubber seal 62, each of which is between the corresponding boss portions opposed to each other, the amount of displacement of the cover member 63 absorbed by the rubber seal 62 is smaller, and therefore the force from the cover member 63 is more likely to be transmitted to the connector housing 61. Thus, in the present embodiment, it is easier for the connector housing 61 to be displaced forward when the cover member 63 is pushed forward.

Figure 8C:
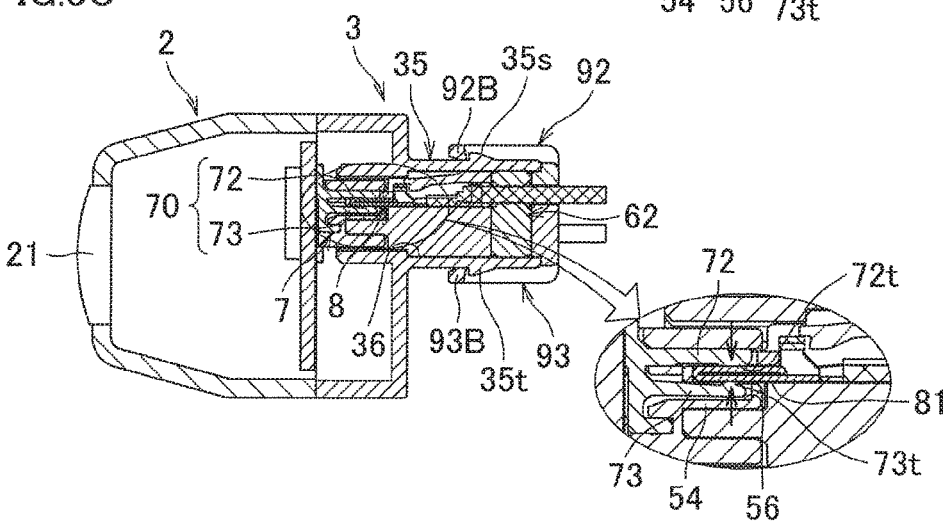

Furthermore, as shown in FIG. 8C, after the rubber seal 62 is disposed in the through hole 36, the projections provided on the outer circumferential surface of the rubber seal 62 are pressed and deformed by the inner circumferential surface of the rear housing 35, so that the rubber seal 62 pushes the rear housing 35 from its inside, throughout the entire outer circumference of the rubber seal 62. As a result, the rubber seal 62 is in close contact with the rear housing 35 to eliminate a gap between them.

Moreover, in the above-described process, the front connecting portion 92B of the upper extension portion 92 of the connector 6 moves over the upper engaging portion 35$s$ of the rear housing 35 while being elastically deformed upward. When the sliding of each female terminal 7 and the corresponding male terminal 8 on each other is completed, the front connecting portion 92B is elastically returned to its original position to be positioned in front of the upper engaging portion 35$s$. Thus, the front connecting portion 92B is engaged with the upper engaging portion 35$s$. Similarly to the above, the front connecting portion 93B of the lower extension portion 93 also moves over the lower engaging portion 35$t$ of the rear housing 35 while being elastically deformed downward. When the sliding of each female terminal 7 and the corresponding male terminal 8 on each other is completed, the front connecting portion 93B is elastically returned to its original position to be positioned in front of the lower engaging portion 35$t$. Thus, the front connecting portion 93B is engaged with the lower engaging portion 35$t$.

The engagement between the front connecting portion 92B and the upper engaging portion 35$s$ and the engagement between the front connecting portion 93B and the lower engaging portion 35$t$ prevent the connector 6 from moving rearward. This keeps the state in which the male terminals 8 are electrically connected to the female terminals 7, respectively, and the state in which the imaging element is electrically connected to the cables 9 lasts.

The present embodiment described above provides the following advantageous effects. Both the female terminals 7 and the male terminals 8 are elastically deformable in the up-down direction. Therefore, if the imaging device 1 is subjected to vibration and or shock, it is possible to absorb the vibration and/or shock between the terminals, as compared with cases where either the female or male terminals are elastically deformable in the up-down direction. This improves the reliability in the electrical connections between the female terminals 7 and the male terminals 8.

Further, in the present embodiment, the electrical connection between the imaging element and the connector 6 is established by bringing the female terminals 7 and the male terminals 8 into directly contact with each other in the through hole 36 of the rear case 3. Conventionally, terminals other than the female and male terminals are attached to the rear case 3, and the electrical connection between the female and male terminals is achieved via the other terminals. As compared with this conventional arrangement, the number of connections between terminals is reducible in the present embodiment. This improves the reliability in the electrical connections between the female terminals 7 and the male terminals 8.

Furthermore, in the present embodiment, the cables 9 are connected to the male terminals 8 accommodated in the connector housing 61 of the connector 6, and the connector housing 61 is attachable to and detachable from the rear case 3. This allows the rear case 3, to which the connector housing 61 with the cables 9 is not attached, to be fixed to the front case 2, and therefore, there is no interference by the cables 9 with a tool for fixing the rear case 3. This improves the operability in the process of assembling the imaging device 1.

In addition to the above, the rubber seal 62 is in close contact with the rear housing 35 of the rear case 3 to eliminate a gap between them, and this prevents liquid or the like from entering inside from between the rear case 3 and the connector 6. Furthermore, the rubber seal 62 is also in close contact with the cables 9 without a gap between them.

Still further, the connector 6 includes the cover member 63 disposed behind the rubber seal 62 made of elastic material. This makes it possible to displace forward the connector 6 with the rubber seal 62 and the connector housing 61 by pushing the cover member 63 forward.

The connector housing 61 of the connector 6 is provided with the housing upper boss portion 66 and the housing lower boss portion 67. The cover member 63 of the connector 6 is provided with the cover upper boss portion 96 and the cover lower boss portion 97 positioned so as to be respectively opposed to the housing upper and lower boss portions 66 and 67 in the front-rear direction. Furthermore, the rubber seal 62 is provided with recesses positioned so as to be respectively opposed to the above-mentioned boss portions. When the boss portions are respectively fitted in the recesses, each portion of the rubber seal 62, which is between the corresponding pair of opposed boss portions, has a thickness smaller than the remaining portion of the rubber seal 62. When the cover member 63 of the connector 6 is pushed forward, the amount of elastic deformation is smaller at the portions of the rubber seal 62, each of which is between the corresponding opposed boss portions, and therefore the force from the cover member 63 is more likely to be transmitted to the connector housing 61 at these portions. This makes it easier to displace the connector housing 61 forward, which allows the connector housing 61 to be completely mated with the rear housing 35 of the rear case 3 in the through hole 36. Accordingly, the possibility of occurrence of an error in the process decreases, to prevent poor connection between the female terminals 7 and the male terminals 8.

The boss portions of each member are positioned symmetrical with respect to the center C of the connector 6 when the connector 6 is viewed in the front-rear direction, and therefore it is more likely that the force from the cover member 63 is uniformly exerted onto the connector housing 61. Due to this, the amount of forward displacement of the connector housing 61 is uniform throughout the whole connector housing 61, which makes it easier for the connector housing 61 of the connector 6 to be completely mated with the rear housing 35 in the through hole 36.

After completion of the sliding of the female terminals 7 and the male terminals 8 on each other, the front connecting portion 92B of the connector 6 is engaged with the upper engaging portion 35s of the rear case 3, and the front connecting portion 93B of the connector 6 is engaged with the lower engaging portion 35t of the rear case 3. These engagements prevent the connector 6 to be displaced rearward. Due to this, the state in which the male terminals 8 are electrically connected to the female terminals 7 is maintained, and the state in which the imaging element is electrically connected to the cables 9 lasts.

Furthermore, the camera case 4 is easily replaceable with another one, by detaching the connector 6 from the rear case 3.

<Modifications>

The following describes modifications of the present embodiment. While in the above-described embodiment, the housing upper boss portion 66 and the housing lower boss portion 67 are positioned symmetrical with respect to the center C of the connector 6, and the cover upper boss portion 96 and the cover lower boss portion 97 are positioned symmetrical with respect to the center C of the connector 6, the positions of these boss portions are changeable. For example, a plurality of boss portions may be positioned symmetrical with respect to the center C of the connector 6, in a manner different from that of the above-described embodiment. Alternatively, a plurality of boss portions may be positioned symmetrical with respect to a linear line passing through the center C of the connector 6 when the connector 6 is viewed in the front-rear direction.

In the above-described embodiment, the arrangement to make engagement between the rear case 3 and the connector 6 is as follows: the rear housing 35 of the rear case 3 includes the upper engaging portion 35s and the lower engaging portion 35t; the cover member 63 of the connector 6 includes the front connecting portion 92B and the front connecting portion 93B; the front connecting portion 92B is designed to be engaged with the upper engaging portion 35s and the front connecting portion 93B is designed to be engaged with the lower engaging portion 35t. However, the arrangement to make engagement between the rear case 3 and the connector 6 is not limited to this, and may be changed. While in the above-described embodiment, the connector housing 61 is attachable to and detachable from the rear case 3, the connector housing 61 may be configured to be non-detachable after attached to the rear case 3.

While the above-described embodiment deals with the case where the lens member 51 is attached to the substrate 5, the lens member 51 may be attached to the front end portion of the front case 2, in place of the protector 21. In this case, a lens member with a protector may or may not be provided at the front end portion of the front case 2. Furthermore, the above-described embodiment may be modified such that two lens members are used: one of the lens members may be attached to the substrate 5; and the other of the lens members may be attached to the front end portion of the front case 2. The above-described embodiment may be further modified such that: a protector is provided at the front end portion of the front case 2; and a lens member is attached to the front case 2 so as to be located in the front case 2. Still further, the protector and the front case do not have to be unitarily formed. The configurations (e.g., the shapes and materials) of the lens member and the protector are not limited to, but may be different from, those described in the above-described embodiment.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An imaging device comprising:
a first case having an opening;
a substrate on which a first terminal electrically connected to an imaging element is mounted, the substrate being provided in the first case;
a lens member attached to the first case or to the substrate;
a second case covering the opening of the first case; and
a connector, wherein:
a first terminal accommodation portion accommodating the first terminal is fixed to the substrate;
the connector includes a second terminal accommodation portion accommodating a second terminal designed to be electrically connected to the first terminal;
the second case has a through hole extending in an opposed direction in which the first case and the second case are opposed to each other, the through hole being capable of accommodating the first terminal accommodation portion and the second terminal accommodation portion;
the second terminal is connected with a cable;
the connector is attachable to the second case so that the second terminal accommodation portion is accommodated in the through hole while the connector is attached to the second case; and
the first and second terminals extend along the opposed direction, and the first and second terminals are configured so that, in a process in which the first terminal accommodation portion and the second terminal accommodation portion are inserted to be accommodated in the through hole, the first and second terminals come into contact with each other while sliding on each other in the through hole and the first and second terminals are elastically deformable in a first direction orthogonal to the opposed direction upon contact with each other.

2. The imaging device according to claim 1, wherein:
the second case includes a surrounding wall surrounding the through hole;
the connector includes an elastic member made of elastic material; and
the elastic member pushes the surrounding wall from its inside throughout its entire circumference when the connector is attached to the second case with the second terminal accommodation portion accommodated in the through hole.

3. The imaging device according to claim 2, wherein:
the connector includes a cover member opposed to the elastic member;
the second terminal accommodation portion, the elastic member, and the cover member are aligned in the opposed direction in the connector; and
the cable is supported by the elastic member and by the cover member.

4. The imaging device according to claim 3, wherein:
at least one of the second terminal accommodation portion and the cover member is provided with one or more boss portions each protruding toward the elastic member; and
the elastic member is provided with one or more recesses positioned so as to be respectively opposed to the one or more boss portions, each of the recesses being recessed in the opposed direction.

5. The imaging device according to claim 4, wherein:
at least one of the second terminal accommodation portion and the cover member is provided with two or more boss portions; and
the two or more boss portions are positioned symmetrical with respect to a center of the connector or with respect to a line passing through the center of the connector, when the connector is viewed in the opposed direction.

6. The imaging device according to claim 1, wherein:
the connector includes a first engaging portion designed to be engaged with the second case; and
the second case includes a second engaging portion designed to be engaged with the first engaging portion after completion of sliding of the first and second terminals on each other.

7. The imaging device according to claim 1, wherein the connector is detachable from the second case after attached to the second case.

* * * * *